(12) United States Patent
Zhang (10) Patent No.: US 11,050,141 B2
(45) Date of Patent: Jun. 29, 2021

(54) VERTICALLY POLARIZED MIMO ANTENNA AND TERMINAL HAVING SAME

(71) Applicant: XI'AN ZHONGXING NEW SOFTWARE CO. LTD., Shaanxi (CN)

(72) Inventor: Juxiang Zhang, Shenzhen (CN)

(73) Assignee: XI'AN ZHONGXING NEW SOFTWARE CO. LTD., Shaanxi (CN)

(*) Notice: Subject to any disclaimer, the term of this patent is extended or adjusted under 35 U.S.C. 154(b) by 0 days.

(21) Appl. No.: 16/954,104

(22) PCT Filed: Sep. 10, 2018

(86) PCT No.: PCT/CN2018/104756
§ 371 (c)(1),
(2) Date: Jun. 16, 2020

(87) PCT Pub. No.: WO2019/114340
PCT Pub. Date: Jun. 20, 2019

(65) Prior Publication Data
US 2020/0335853 A1   Oct. 22, 2020

(30) Foreign Application Priority Data
Dec. 15, 2017 (CN) .......................... 201711351032.6

(51) Int. Cl.
*H04B 7/0413* (2017.01)
*H01Q 1/24* (2006.01)
*H01Q 1/36* (2006.01)
*H01Q 1/38* (2006.01)

(52) U.S. Cl.
CPC ............ *H01Q 1/243* (2013.01); *H01Q 1/36* (2013.01); *H01Q 1/38* (2013.01); *H04B 7/0413* (2013.01)

(58) Field of Classification Search
CPC . H01Q 1/243; H01Q 1/36; H01Q 1/38; H04B 7/0413
USPC ...................................................... 455/575.7
See application file for complete search history.

(56) References Cited

U.S. PATENT DOCUMENTS

2014/0254700 A1* 9/2014 Hinman ................ H04W 24/08
                                                              375/267
2014/0361950 A1* 12/2014 Ho ............................ H01Q 21/28
                                                              343/893

FOREIGN PATENT DOCUMENTS

| CN | 101223672 A | 7/2008 |
| CN | 104241815 A | 12/2014 |
| CN | 106025503 A | 10/2016 |
| CN | 208014897 U | 10/2018 |
| WO | WO-2008131157 A1 | 10/2008 |

OTHER PUBLICATIONS

International Search Report for Application No. PCT/CN2018/104756, dated Nov. 29, 2018, 4 pages.

* cited by examiner

*Primary Examiner* — Ted M Wang
(74) *Attorney, Agent, or Firm* — Morgan, Lewis & Bockius LLP

(57) ABSTRACT

Provided are a vertically polarized MIMO antenna and a terminal having an MIMO antenna. The antenna includes a primary antenna and a diversity antenna, where a radiation end of the diversity antenna is disposed vertically to a radiation end of the primary antenna. The terminal includes the above-mentioned antenna.

8 Claims, 12 Drawing Sheets

VERTICALLY POLARIZED MIMO ANTENNA AND TERMINAL HAVING SAME

CROSS-REFERENCE TO RELATED APPLICATIONS

This is a National Stage Application, filed under 35 U.S.C. 371, of International Patent Application No. PCT/CN2018/104756, filed on Sep. 10, 2018, which claims priority to Chinese patent application No. 201711351032.6 filed on Dec. 15, 2017, contents of both of which are incorporated herein by reference in their entireties.

TECHNICAL FIELD

The present disclosure relates to the technical field of communication transmission and, in particular, to a vertically polarized multiple input multiple output (MIMO) antenna and a terminal having an MIMO antenna.

BACKGROUND

Currently, the most commonly used primary antenna and diversity antenna are generally distributed up and down or left and right on a terminal, and forms of antennas are conventional planar inverted F-shaped antenna (PIFA), inverted F-shaped antenna (IFA) and monopole antenna.

However, no matter whether the primary antenna and the diversity antenna are placed up and down or left and right, and no matter what form the primary antenna and the diversity antenna takes, a performance indicator and MIMO performance of the antennas can not be considered simultaneously in a limited spatial layout. A problem that system channel capacity is improved by improving the MIMO performance for a full frequency band under the condition of not increasing frequency spectrum resources and antenna transmission power cannot be solved by a conventional method. Especially, for a low frequency part, even for a single low frequency, such as long term evolution band 13 (LTE B13) (on a 5-inch mobile phone, the primary antenna and diversity antenna are just at λ/4, so a conventional antenna form cannot effectively improve MIMO antenna performance), under three states of 70%, 90% and 95% of a theoretical value of throughput, it can not be guaranteed that a corresponding signal-to-noise ratio satisfies requirements of cellular telecommunications industry association (CTIA) at the full angle, and even satisfies requirements of more harsh operators such as verizon wireless (VZW) company.

SUMMARY

The present disclosure provides a vertically polarized MIMO antenna and a terminal having an MIMO antenna, improving efficiency and MIMO performance of the antenna.

The present disclosure adopts technical schemes described below.

In a first aspect, the present disclosure provides a vertically polarized MIMO antenna. The antenna includes a primary antenna and a diversity antenna, where a radiation end of the diversity antenna is disposed vertically to a radiation end of the primary antenna.

In an embodiment, an antenna branch of the primary antenna except for the radiation end of the primary antenna and an antenna branch of the diversity antenna except for the radiation end of the diversity antenna respectively form a geometry of at least one of: a rectangle, a triangle, a circle, a polygon or an irregular shape.

In an embodiment, the diversity antenna and the primary antenna are disposed on the same side or different sides of a circuit board of a terminal.

In an embodiment, the diversity antenna and the primary antenna are disposed at two ends of the circuit board of the terminal separately, or at a diagonal line of the circuit board of the terminal.

In an embodiment, the antenna further includes a parasitic coupling unit disposed inside or outside the geometry formed by the diversity antenna.

In an embodiment, the parasitic coupling unit is disposed within a preset range of the diversity antenna.

In a second aspect, the present disclosure further provides a terminal having an MIMO antenna. The terminal includes the above-mentioned antenna.

A combination form of the MIMO antenna in the present disclosure is not limited to a position of antenna feed, so that the size of the terminal (such as a mobile phone) is not limited to a spacing of the antennas (generally, low-frequency MIMO performance of a 5-inch mobile phone is difficult to satisfy demands, so it is necessary to appropriately increase the size of the whole mobile phone), and antenna feed points do not need to be designed symmetrically or diagonally. Therefore, flexible and diverse characteristics of the layout of the current terminal are satisfied, the efficiency of the antenna is maximally improved, an envelope correlated coefficiency (ECC) is reduced, an isolation degree is improved, and meanwhile, the MIMO performance of the antenna is improved.

DETAILED DESCRIPTION

The embodiments of the present disclosure will be described hereinafter in conjunction with the drawings. It is to be noted that the embodiments described herein and the features thereof may be combined with each other if not in collision.

An embodiment of the present disclosure provides a vertically polarized MIMO antenna. The antenna includes a primary antenna and a diversity antenna, where a radiation end of the diversity antenna is disposed vertically to a radiation end of the primary antenna.

An antenna branch of the primary antenna except for the radiation end of the primary antenna and an antenna branch of the diversity antenna except for the radiation end of the diversity antenna respectively form a geometry of at least one of: a rectangle, a triangle, a circle, a polygon or an irregular shape.

In the embodiment of the present disclosure, the radiation end of the diversity antenna is disposed vertically to the radiation end of the primary antenna, such that a polarization direction of radiation of the diversity antenna and a polarization direction of radiation of the primary antenna may be optimized and adjusted, to enable the polarization direction of diversity antenna radiation to be nearly perpendicular to the polarization direction of primary antenna radiation.

The antenna provided in the embodiment of the present disclosure is mainly suitable for a 2*2 MIMO system. No matter what trace form the primary antenna presents, a radiation end of the corresponding diversity antenna is disposed vertically to a radiation end surface of the primary antenna. Other antenna branches except for radiation end portions are connected through forms of the rectangle, the triangle, the circle, the polygon or the like. Two antennas in any antenna combination may be primary and diversity to each other.

As shown in FIG. 1 to FIG. 34, the primary antenna is located at a lower part of the drawings, the diversity antenna is located at an upper part of the drawings, and the diversity antenna and the primary antenna are disposed on the same side or different sides of a circuit board of a terminal.

The diversity antenna and the primary antenna are disposed at two ends of the circuit board of the terminal separately, or at a diagonal line of the circuit board of the terminal. There is no special requirement for the layout of the diversity antenna and the primary antenna on the circuit board of the terminal and a distance between the diversity antenna and the primary antenna. For example, the distance between the diversity antenna and the primary antenna may be in a range of $\lambda/4$ to $\lambda/10$.

The antennas shown in FIG. 1 to FIG. 4, FIG. 7 to FIG. 10, FIG. 12 to FIG. 13, FIG. 15 to FIG. 17, FIG. 19, FIG. 22, and FIG. 25 to FIG. 34 further includes a parasitic coupling unit disposed inside or outside the geometry formed by the diversity antenna.

The parasitic coupling unit in this embodiment is a short antenna branch provided around the diversity antenna, and a function of the parasitic coupling unit is to increase a bandwidth by near-field coupling of electromagnetic waves.

The parasitic coupling unit is disposed within a preset range of the diversity antenna.

The present disclosure further provides a terminal having an MIMO antenna. The terminal includes the above-mentioned antenna.

Embodiment One

Figure 1:
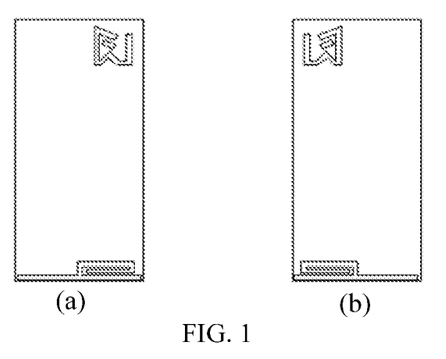
FIG. 1 to FIG. 34 are schematic diagrams of vertically polarized MIMO antennas according to embodiments of the present disclosure.
Figure 2:
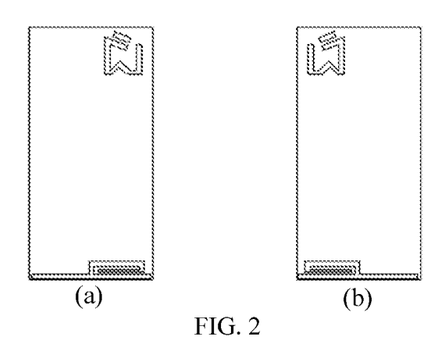
Figure 3:
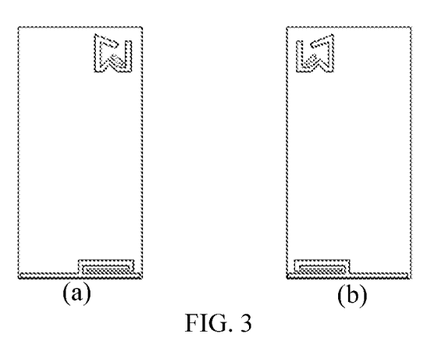
Figure 4:
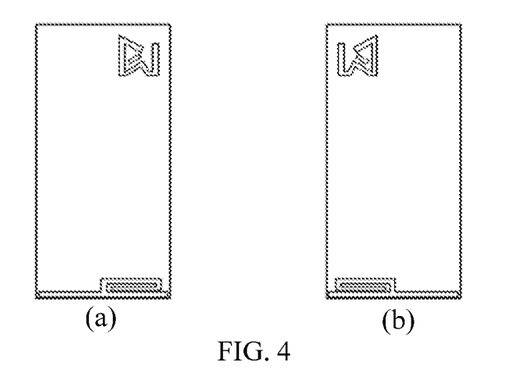
Figure 5:
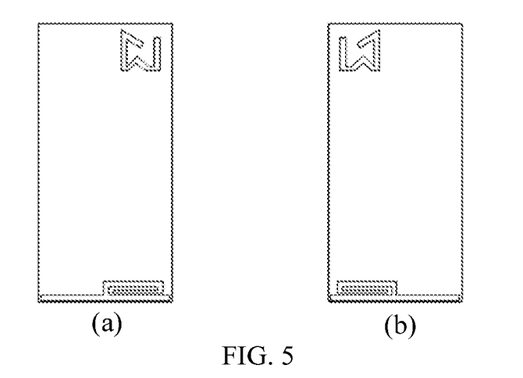
Figure 6:
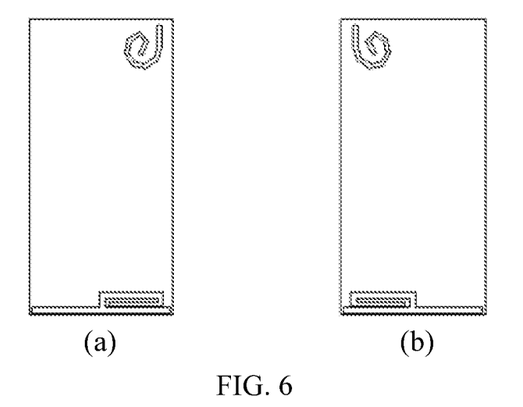
Figure 7:
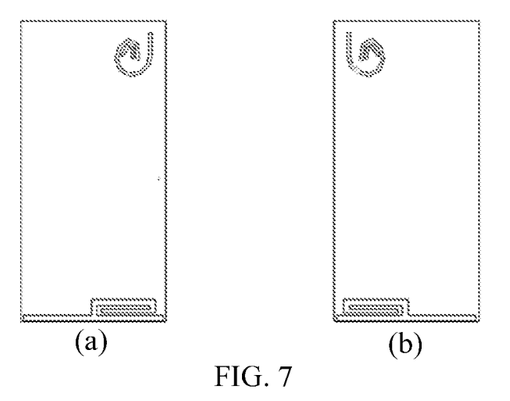
Figure 8:
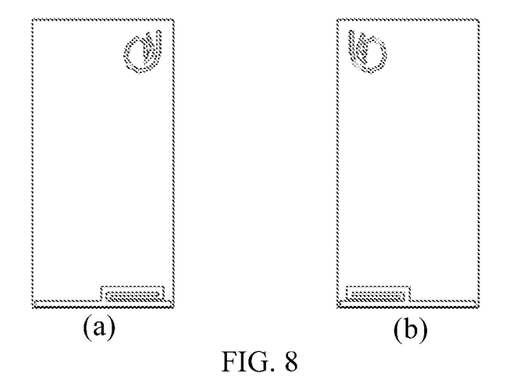
Figure 9:
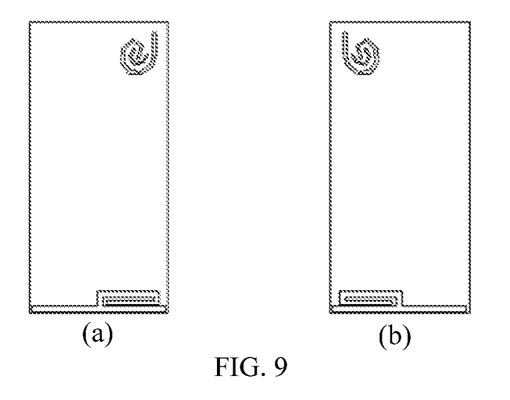
Figure 10:
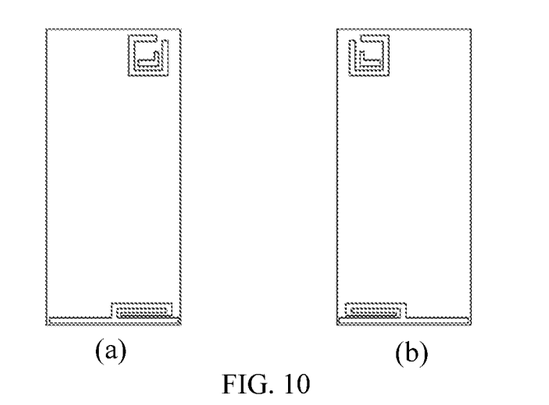
Figure 11:
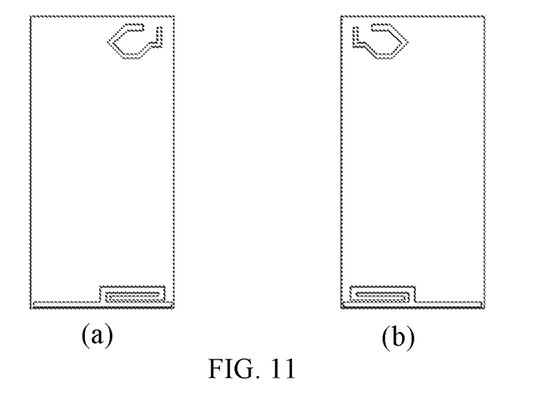
Figure 12:
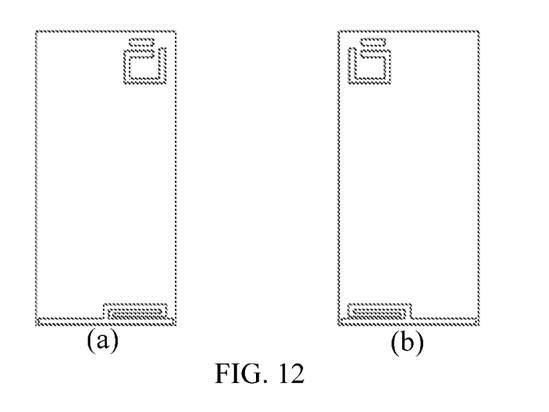
Figure 13:
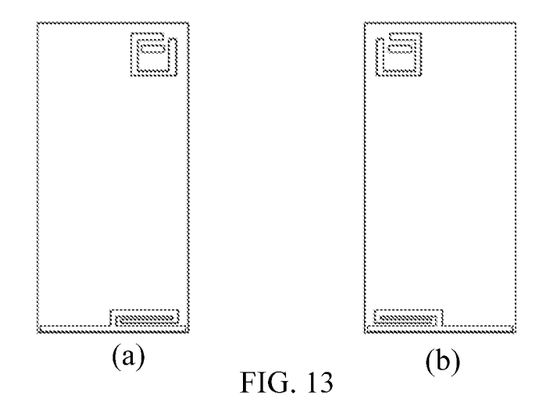
Figure 14:
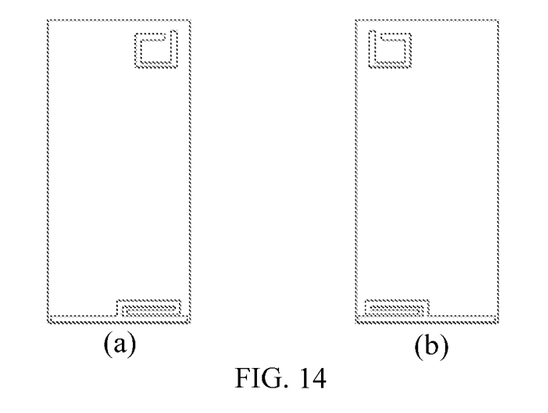
Figure 15:
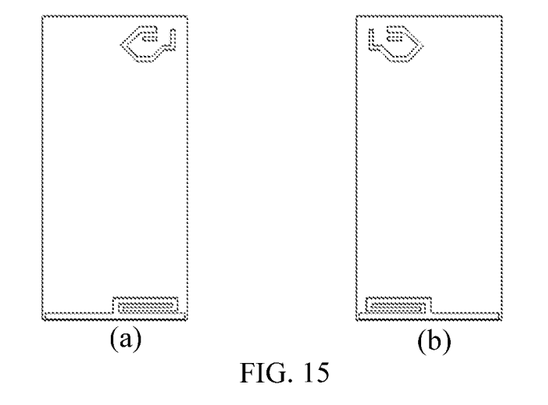
Figure 16:
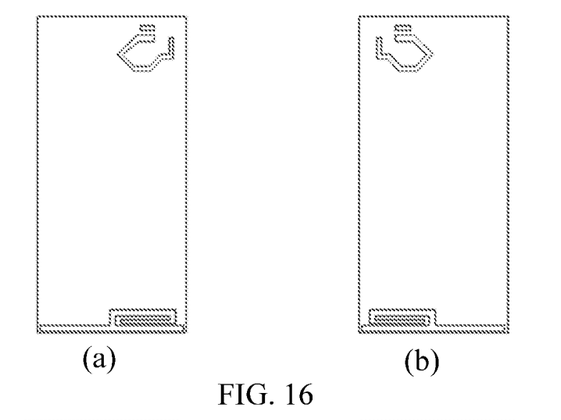
Figure 17:
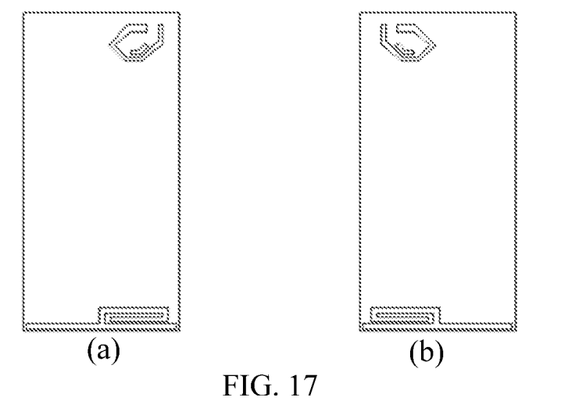
Figure 18:
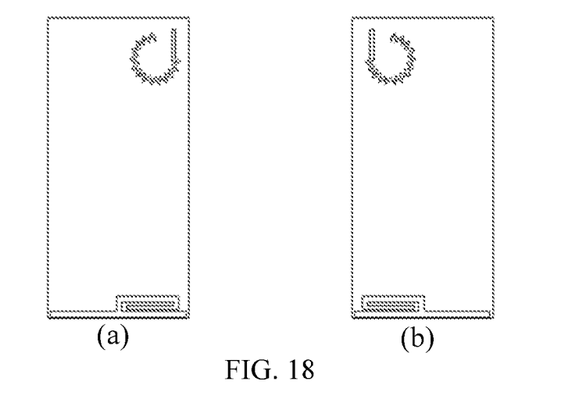
Figure 19:
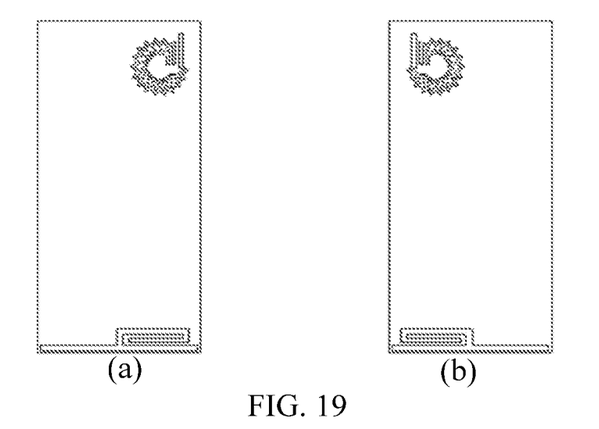
Figure 20:
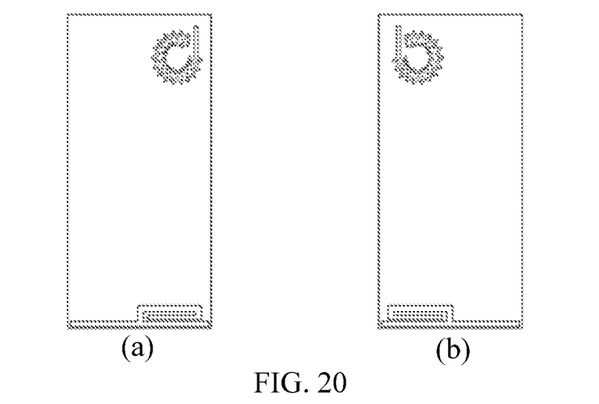
Figure 21:
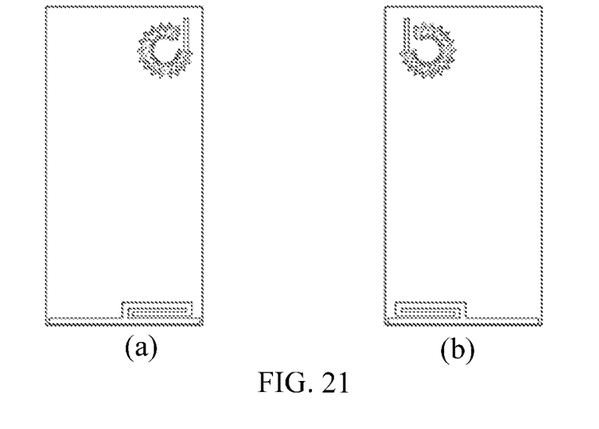
Figure 22:
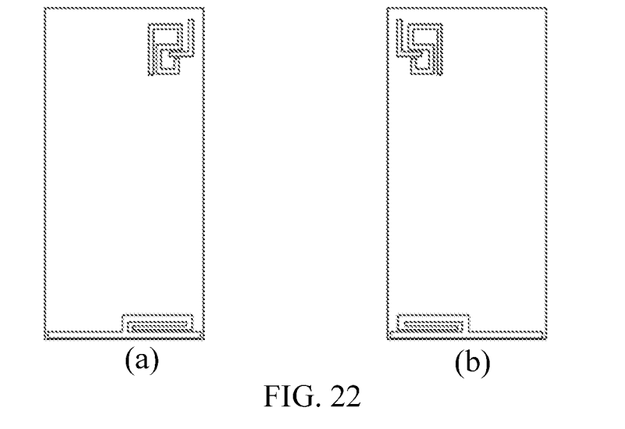
Figure 23:
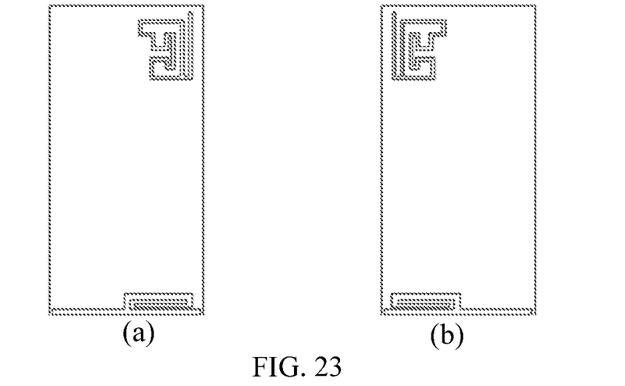
Figure 24:
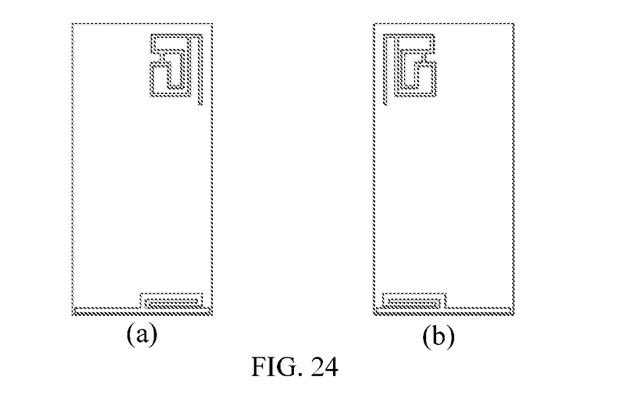
Figure 25:
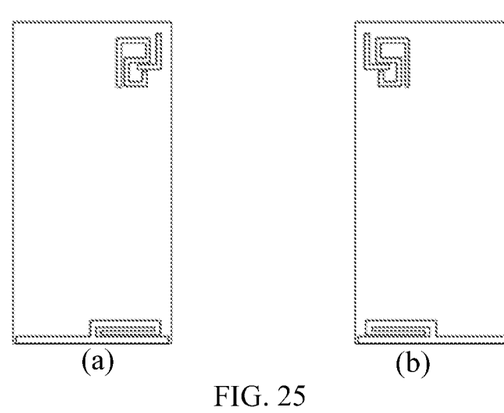
Figure 26:
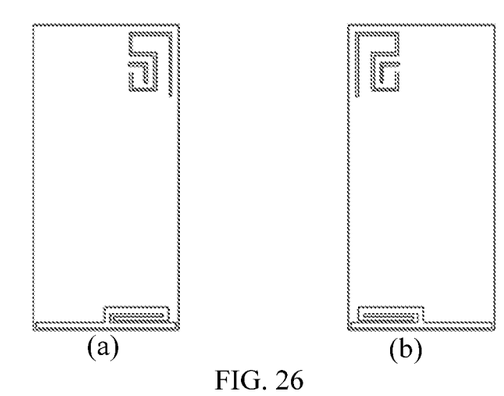
Figure 27:
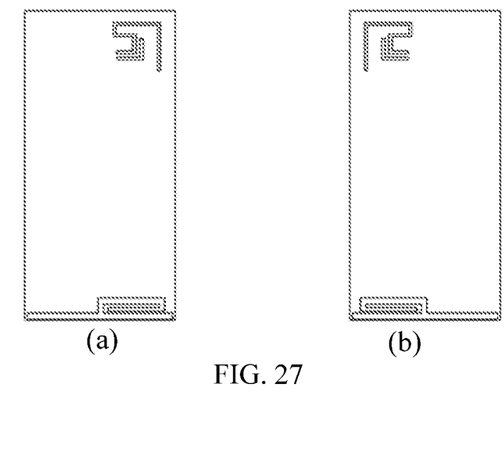
Figure 28:
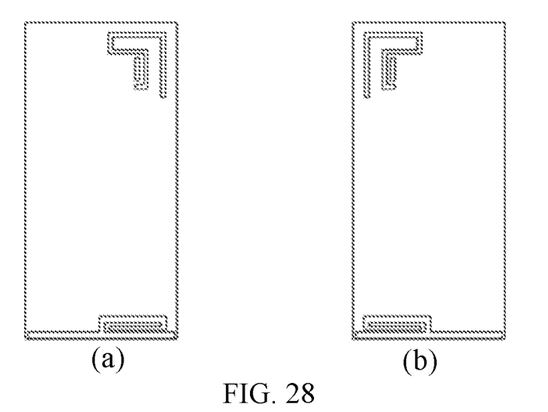
Figure 29:
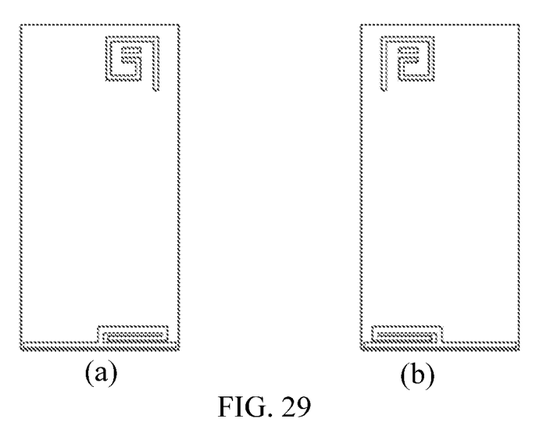
Figure 30:
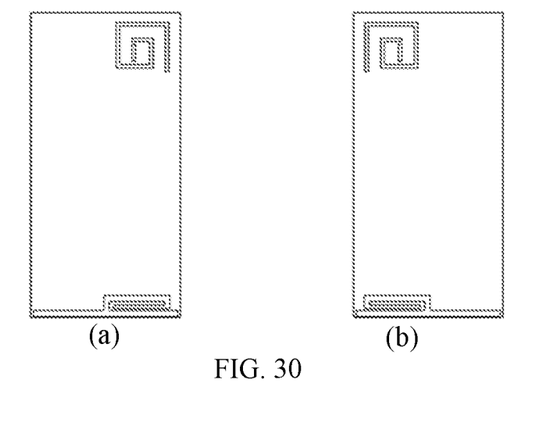
Figure 31:
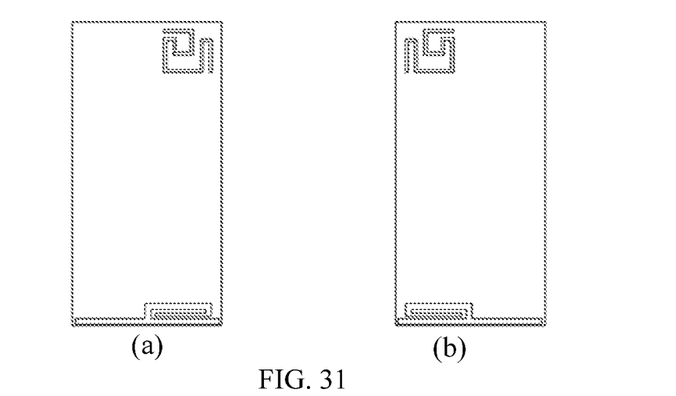
Figure 32:
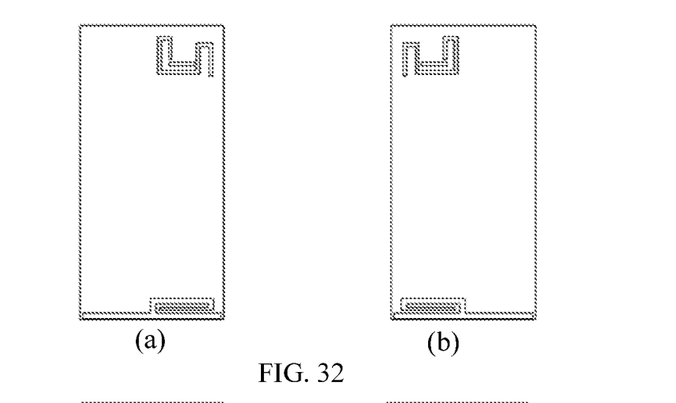
Figure 33:
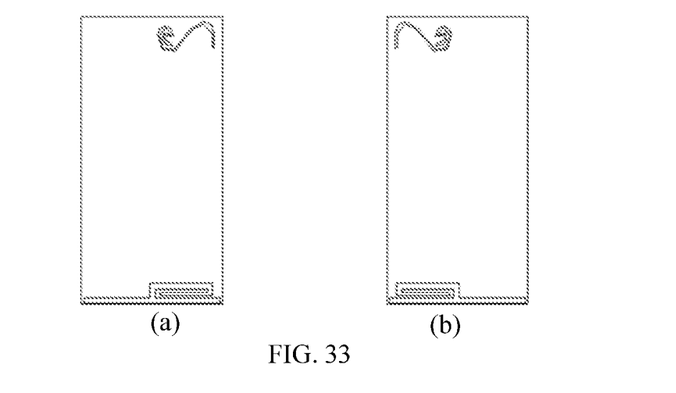
Figure 34:
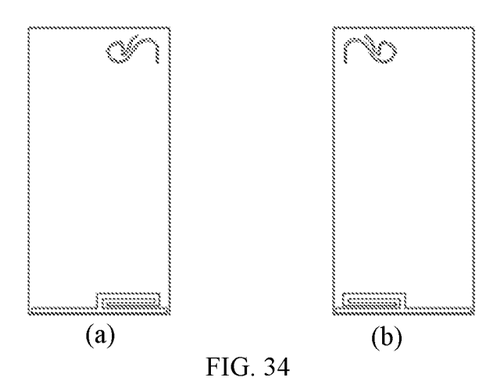
Figure 35:
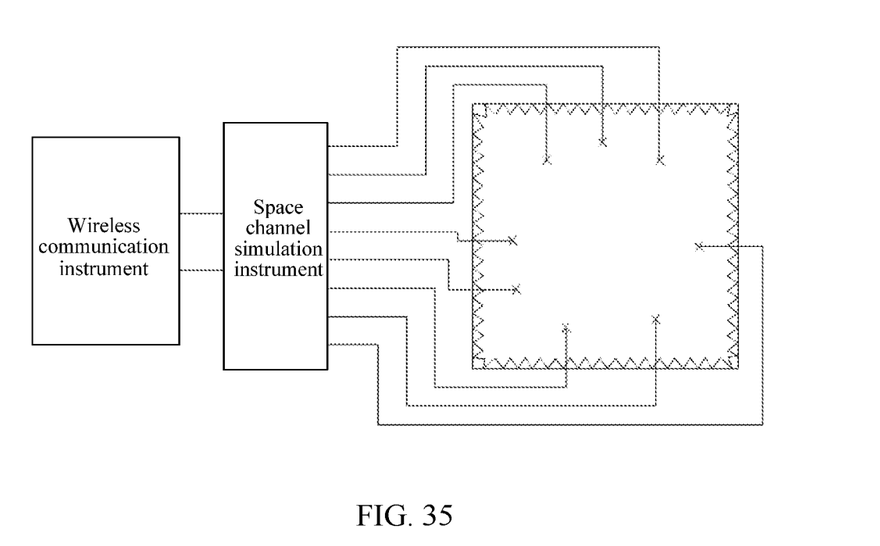
FIG. 35 is a test schematic diagram of over the air (OTA) performance of an MIMO antenna in an embodiment one of the present disclosure.

As shown in FIG. 1 to FIG. 34, in this embodiment, for an MIMO antenna of which ends are vertically distributed in a 2*2 MIMO antenna system, it should be ensured that a radiation end of a primary antenna and a radiation end of a diversity antenna corresponding to the primary antenna keep vertically polarized, and other branches of the antennas are not limited to any form. The MIMO antenna can reduce an ECC indicator and an isolation degree between antennas to a certain extent, and meanwhile, can improve performance of the MIMO antenna. The performance is tested by a manner described below FIG. 35 is a test schematic diagram of OTA performance of the MIMO antenna and a system block diagram of a certification test certified and accredited by a CTIA and performed in a certification anechoic chamber according to this embodiment.

In the existing 4G mobile phone terminal, the MIMO technology mainly introduces at least two antennas to receive downlink signals. The so-called MIMO OTA is to accurately simulate wireless transmission environment in the anechoic chamber, and then test a device to be tested under the simulated wireless transmission environment. Currently, a certification test method accredited by the CTIA is a Multi Probe Anechoic Chamber (MPAC) method as shown in FIG. 35. A main principle of the method is as follows: 8 or 16 antenna probes are installed in an absorbing anechoic chamber, and each antenna here is in a double polarization form. Each probe antenna transmits signals that have experienced wireless fading channels to the device to be tested from different directions. A wireless fading channel with controllable directivity may be directly produced in the anechoic chamber by controlling signal power transmitted by each probe. According to the multi-probe method, simulation of multipath of a wireless channel, a power delay profile (PDP) and Doppler characteristics are implemented in a channel simulator. Simulation of spatial directivity is implemented by installing probe antennas in different directions and power ratio.

A test result shows that the MIMO antenna provided in this embodiment has much better antenna form and MIMO performance than other trace forms of a machine with the same size under the condition of the same isolation degree. An extreme value position in a pattern of the primary antenna and diversity antenna can be controlled by controlling relative positions of main radiation end faces of the primary antenna and the diversity antenna, thus achieving maximum dual polarization of the antennas. Meanwhile, on a premise of ensuring the antenna efficiency, the isolation degree between antennas and the ECC can be effectively controlled.

INDUSTRIAL APPLICABILITY

The present disclosure is applicable to the technical field of communication transmission, and is used for satisfying flexible and diverse characteristics of the layout of the current terminal, maximally improving the efficiency of the antenna, reducing the ECC, improving the isolation degree, and meanwhile, improving the MIMO performance of the antenna.

What is claimed is:

1. A vertically polarized multiple input multiple output (MIMO) antenna, comprising: a primary antenna and a diversity antenna, wherein a radiation end of the diversity antenna is disposed vertically to a radiation end of the primary antenna;

wherein an antenna branch of the primary antenna except for the radiation end of the primary antenna and an antenna branch of the diversity antenna except for the radiation end of the diversity antenna respectively form a geometry of at least one of: a triangle, a circle, or a polygon; and wherein the MIMO antenna further comprises: a parasitic coupling unit disposed inside or outside the geometry formed by the diversity antenna, and the parasitic coupling unit is configured to increase a bandwidth by near-field coupling of electromagnetic waves.

2. The antenna of claim 1, wherein the diversity antenna and the primary antenna are disposed on a same side or different sides of a circuit board of a terminal.

3. The antenna of claim 2, wherein the diversity antenna and the primary antenna are disposed at two ends of the circuit board of the terminal separately, or at a diagonal line of the circuit board of the terminal.

4. A terminal having a multiple input multiple output (MIMO) antenna, comprising the antenna of claim 2.

5. A terminal having a multiple input multiple output (MIMO) antenna, comprising the antenna of claim 3.

6. The antenna of claim 1, wherein the parasitic coupling unit is disposed within a preset range of the diversity antenna.

7. A terminal having a multiple input multiple output (MIMO) antenna, comprising the antenna of claim 6.

8. A terminal having a multiple input multiple output (MIMO) antenna, comprising the antenna of claim 1.

* * * * *